(12) United States Patent
Fujii

(10) Patent No.: US 7,313,383 B2
(45) Date of Patent: Dec. 25, 2007

(54) SYSTEM FOR REGULATING ENTRANCE/EXIT OF PERSON AND COMMUNICATION OF WIRELESS COMMUNICATION TERMINAL, ENTRANCE/EXIT REGULATING APPARATUS TO BE USED FOR THE SYSTEM, AND WIRELESS COMMUNICATION APPARATUS WHOSE COMMUNICATION IS TO BE RESTRICTED

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 10/021,092

(22) Filed: Dec. 19, 2001

(65) Prior Publication Data

US 2002/0082002 A1 Jun. 27, 2002

(30) Foreign Application Priority Data

Dec. 27, 2000 (JP) ............................ 2000-399022

(51) Int. Cl.
*H04M 1/66* (2006.01)

(52) U.S. Cl. .................. 455/410; 455/411; 455/456.1; 455/454; 455/564; 455/565; 455/418; 455/414.2; 455/404.1; 455/574; 455/501; 463/25; 463/1; 463/4

(58) Field of Classification Search ............. 455/456.1, 455/501, 411, 565, 574, 404.1, 418, 456, 455/414.2, 410, 417, 454, 564.565, 414; 235/462.46; 340/825.31, 825.69, 852.33, 340/825.32; 463/25, 1, 47
See application file for complete search history.

(56) References Cited

U.S. PATENT DOCUMENTS

| | | | |
|---|---|---|---|
| 5,157,467 A | 10/1992 | Fujii | ........................... 357/16 |
| 5,311,011 A | 5/1994 | Shimizu et al. | ........... 250/214.1 |
| 6,072,402 A * | 6/2000 | Kniffin et al. | ............. 340/5.28 |
| 6,122,486 A * | 9/2000 | Tanaka et al. | ................. 455/68 |
| 6,343,212 B1 * | 1/2002 | Weber et al. | ............. 455/404.1 |
| 6,421,544 B1 * | 7/2002 | Sawada | ....................... 455/565 |
| 6,438,385 B1 * | 8/2002 | Heinonen et al. | ........... 455/501 |
| 6,473,790 B1 * | 10/2002 | Tagi | ........................... 709/216 |
| 6,496,703 B1 * | 12/2002 | da Silva | ................... 455/456.4 |
| 6,625,455 B1 * | 9/2003 | Ariga | .......................... 455/565 |
| 2002/0034978 A1 * | 3/2002 | Legge et al. | .................. 463/25 |
| 2002/0060246 A1 * | 5/2002 | Gobburu et al. | ........ 235/462.46 |

FOREIGN PATENT DOCUMENTS

| | | |
|---|---|---|
| JP | 11-127483 | 5/1999 |
| JP | 2000-268215 | 9/2000 |

* cited by examiner

*Primary Examiner*—Joseph Feild
*Assistant Examiner*—Randy Peaches
(74) *Attorney, Agent, or Firm*—Fitzpatrick, Cella, Harper & Scinto

(57) ABSTRACT

Communication control is made which satisfies the needs of both an owner or manager of a communication place and users of wireless communication terminals. As a user of a cellular phone passes through an automatic ticket gate and enters a predetermined area, The ticket gate and cellular phone check whether the cellular phone has an electronic ticket for entering the area. After this check, the automatic ticket gate requests the cellular phone to restrict the communication function. After the requested restriction is set by the cellular phone, entrance to the area is permitted and the gate is opened.

19 Claims, 12 Drawing Sheets

FIG. 3

| LEVEL "0" | NON-RESTRICTION MODE |
|---|---|
| LEVEL "1" | MANNER MODE |
| LEVEL "2" | DRIVE MODE |
| LEVEL "3" | REAL TIME COMMUNICATION RESTRICTION MODE |
| LEVEL "4" | CALL IN-OUT RESTRICTION MODE |
| LEVEL "5" | WIRELESS SIGNAL TRANSMISSION RESTRICTION MODE |

FIG. 4

| 00:00-07:00 | NON-RESTRICTION MODE |
|---|---|
| 07:00-10:00 | AUTOMATIC ANSWERING TELEPHONE MODE |
| 10:00-17:00 | DIRECT TRANSFER MODE |
| 17:00-24:00 | DATA CONVERSION TRANSFER MODE |

FIG. 5

| OPERATION LEVEL INFORMATION |
|---|
| COMMUNICATION RESTRICTION ACCEPTANCE INFORMATION |
| SUBSCRIBER IDENTIFYING CODE LENGTH |
| SUBSCRIBER IDENTIFYING CODE |
| CHECKSUM |

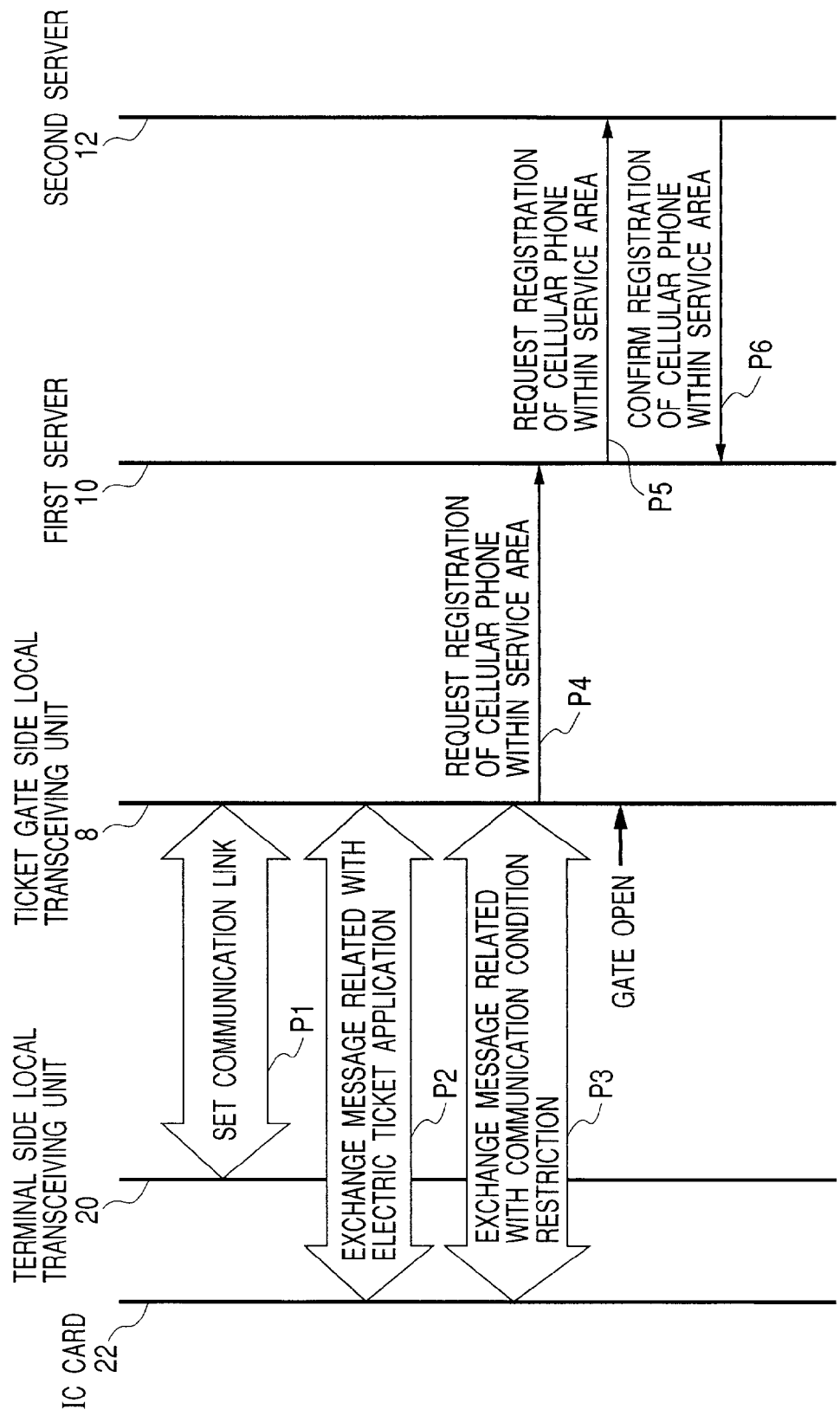

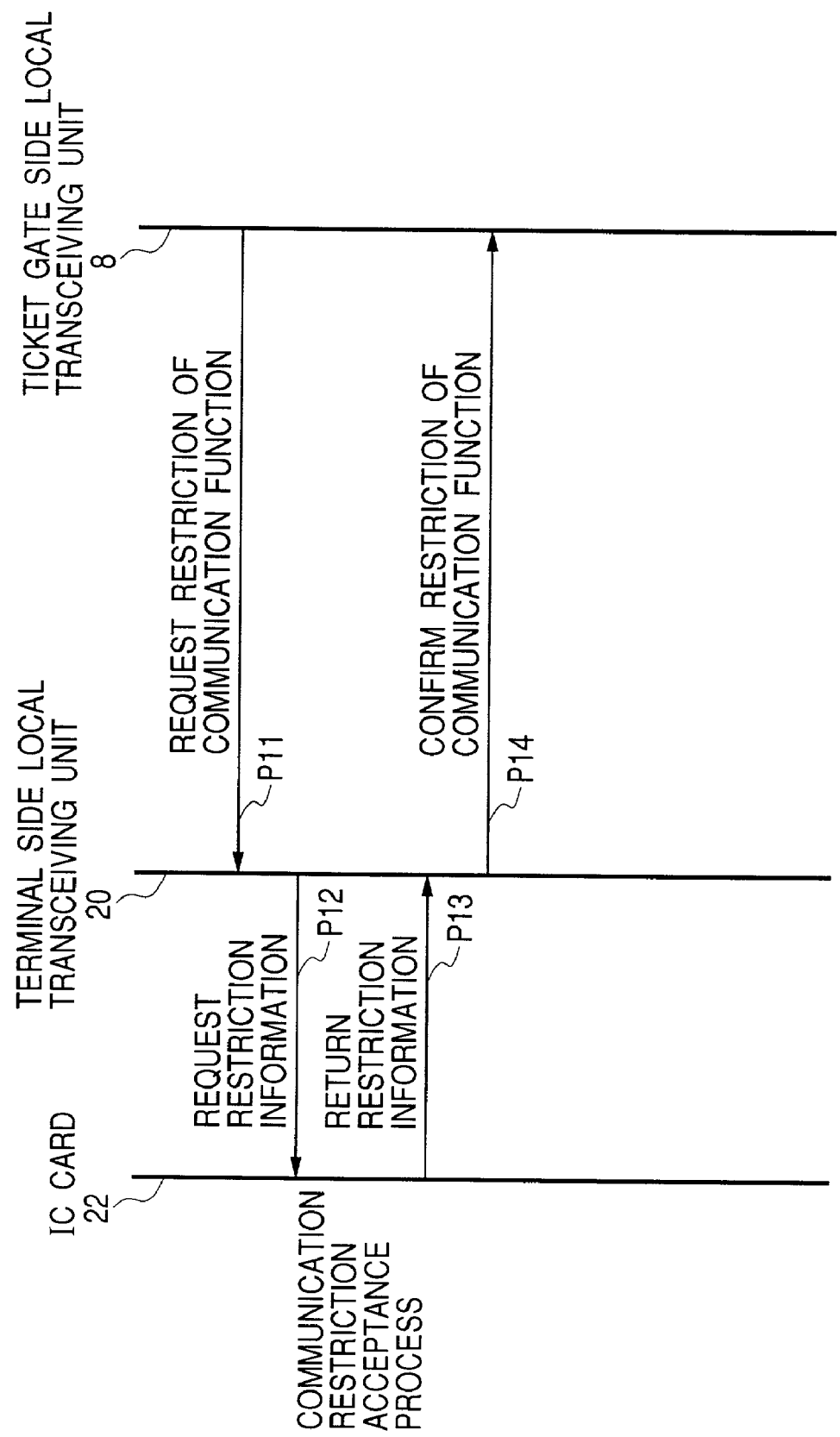

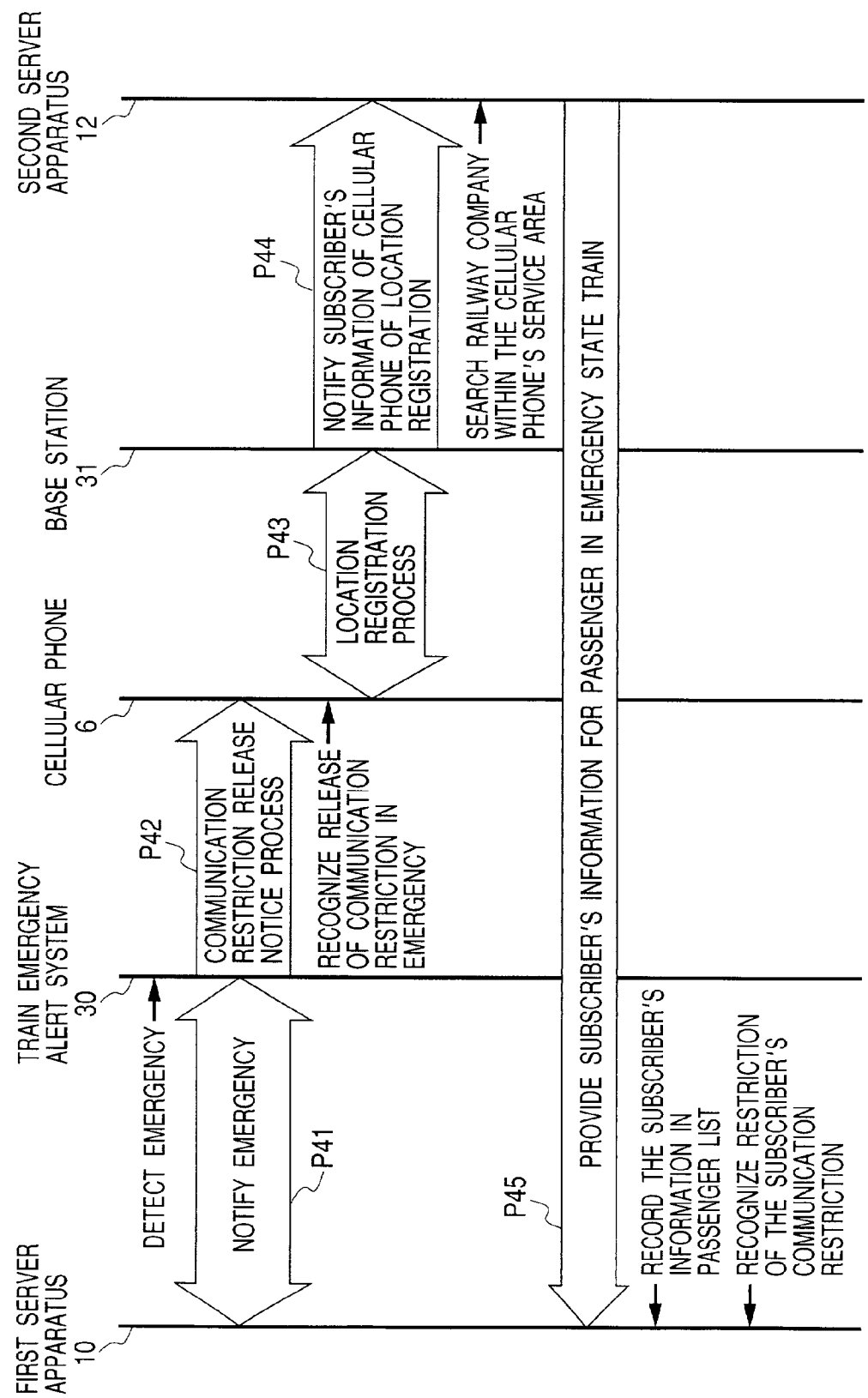

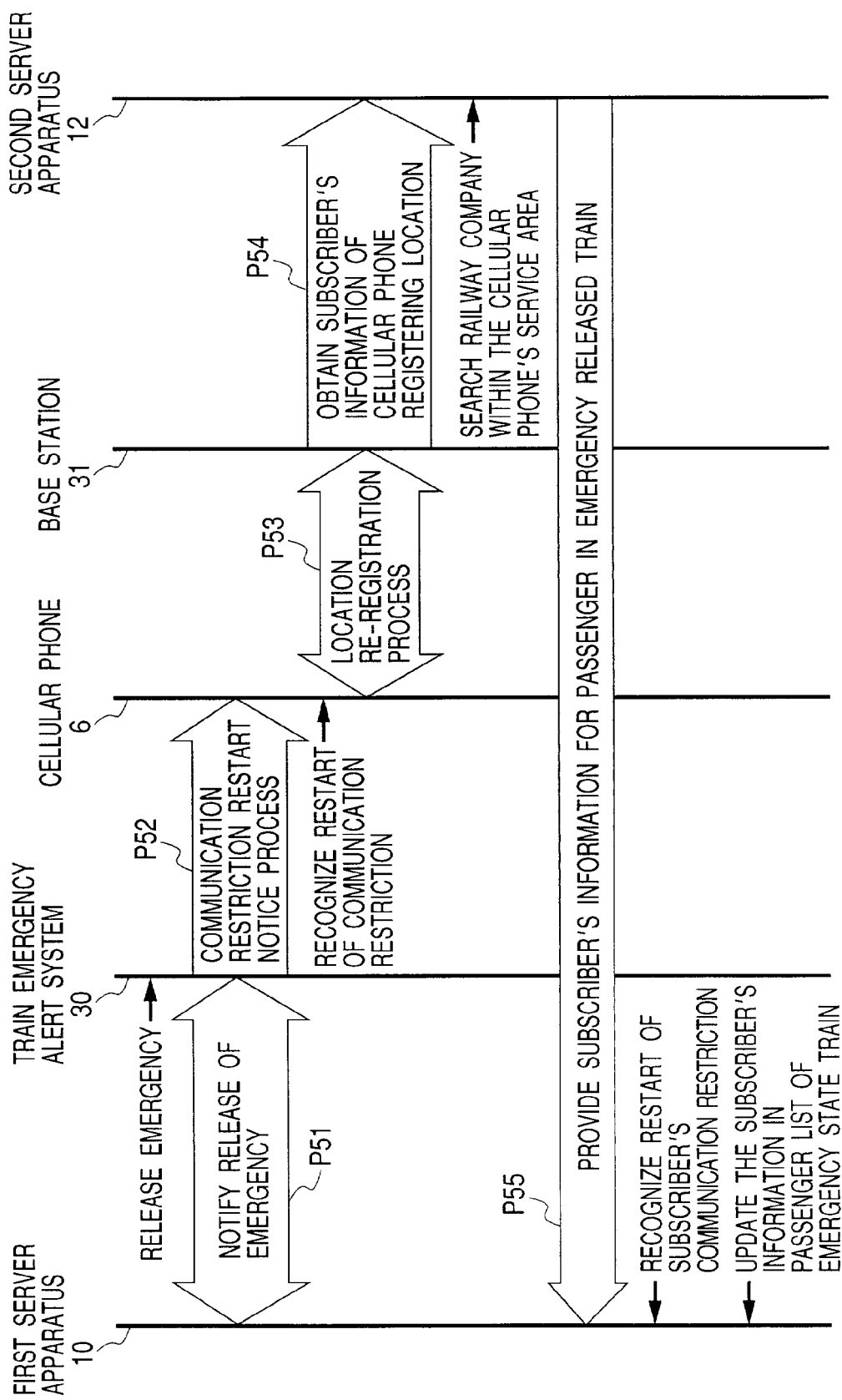

SYSTEM FOR REGULATING ENTRANCE/EXIT OF PERSON AND COMMUNICATION OF WIRELESS COMMUNICATION TERMINAL, ENTRANCE/EXIT REGULATING APPARATUS TO BE USED FOR THE SYSTEM, AND WIRELESS COMMUNICATION APPARATUS WHOSE COMMUNICATION IS TO BE RESTRICTED

BACKGROUND OF THE INVENTION

1. Field of the Invention

The present invention relates to a system for regulating entrance/exit of persons and communication of wireless communication terminal, an entrance/exit regulating apparatus to be used for such a system, and a wireless communication apparatus whose communication is to be restricted.

2. Related Background Art

A portable wireless communication terminal such as a cellular phone can perform wireless communication of the type desired by a user if the terminal is in a wireless communication service area. Incoming call sounds of a portable wireless communication terminal or user voices may disturb nearby peoples in a train used by a number of indefinite persons, in a library, theater, shop or the like required to be in a quiet environment.

Portable wireless communication terminals having a so-called manner mode capable of restricting speech in a specific location such as a train and a library are now prevailing.

However, setting and resetting the manner mode rely upon will and moral of a user of a portable wireless communication terminal. For example, in the case of a train, a railway company as an owner or manager of communication places cannot directly make speech restriction.

As a countermeasure, there is a jamming apparatus. With this apparatus, interference waves of a weak electric field extending only to the communication restriction area are superposed upon a control channel for controlling establishment of a wireless communication link to disable connection of the wireless communication terminal.

The jamming apparatus of this type is allowed to be installed only in limited areas such as medical facilities and theaters from the legal viewpoint, because communication of a portable wireless communication terminal becomes impossible.

In this context, techniques have been proposed. With these techniques, restriction information of a communication function is always transmitted at a weak level of an electronic field extending only to the communication restriction area, and a portable wireless communication terminal autonomously restricts the communication function in accordance with the received restriction information.

With this method, however, it is difficult to restrict the communication function by specifying the communication restriction area. In a moving train in particular, a railway company as an owner or manager of trains cannot set or reset the communication restriction.

There is a system in which a function of instructing a mode change of a portable wireless communication terminal is provided near at a gate in the communication restriction area and when a user of the terminal passes through the gate, the mode of the terminal is changed.

With this system, however, the communication restriction is made relative to a portable wireless communication terminal allowed to pass through the gate. Therefore, even if the user does not agree to communication regulations, the user can pass through the gate.

SUMMARY OF THE INVENTION

It is an object of the invention to satisfy the needs of both an owner or manager of a communication place and users of wireless communication terminals.

It is another object of the invention to reliably perform both entrance/exit regulations of persons and communication regulations of communication apparatus.

It is another object of the invention to allow only an apparatus with communication restriction to enter a predetermined area.

Other object of the invention will become apparent from the following description of embodiments when read in conjunction with the accompanying drawings.

BRIEF DESCRIPTION OF THE DRAWINGS

FIG. 3 is a table showing communication restriction levels of the cellular phone.

FIG. 4 is a table showing services in different time zones supplied by a mobile communication carrier according to an embodiment of the invention.

FIG. 5 is a diagram showing an example of the format of function information parameters according to the embodiment.

FIG. 6 is a sequence diagram illustrating a communication condition restriction process according to the embodiment.

FIG. 7 is a sequence diagram illustrating a process of exchanging messages related to communication condition restriction according to the embodiment.

FIG. 13 is a sequence diagram illustrating a communication condition restriction release process when an emergency state occurs, according to the embodiment.

FIG. 14 is a sequence diagram illustrating a communication condition restriction release process when an emergency state is released, according to the embodiment.

DESCRIPTION OF THE PREFERRED EMBODIMENTS

Embodiments of the invention will be described with reference to the accompanying drawings.

Figure 1:
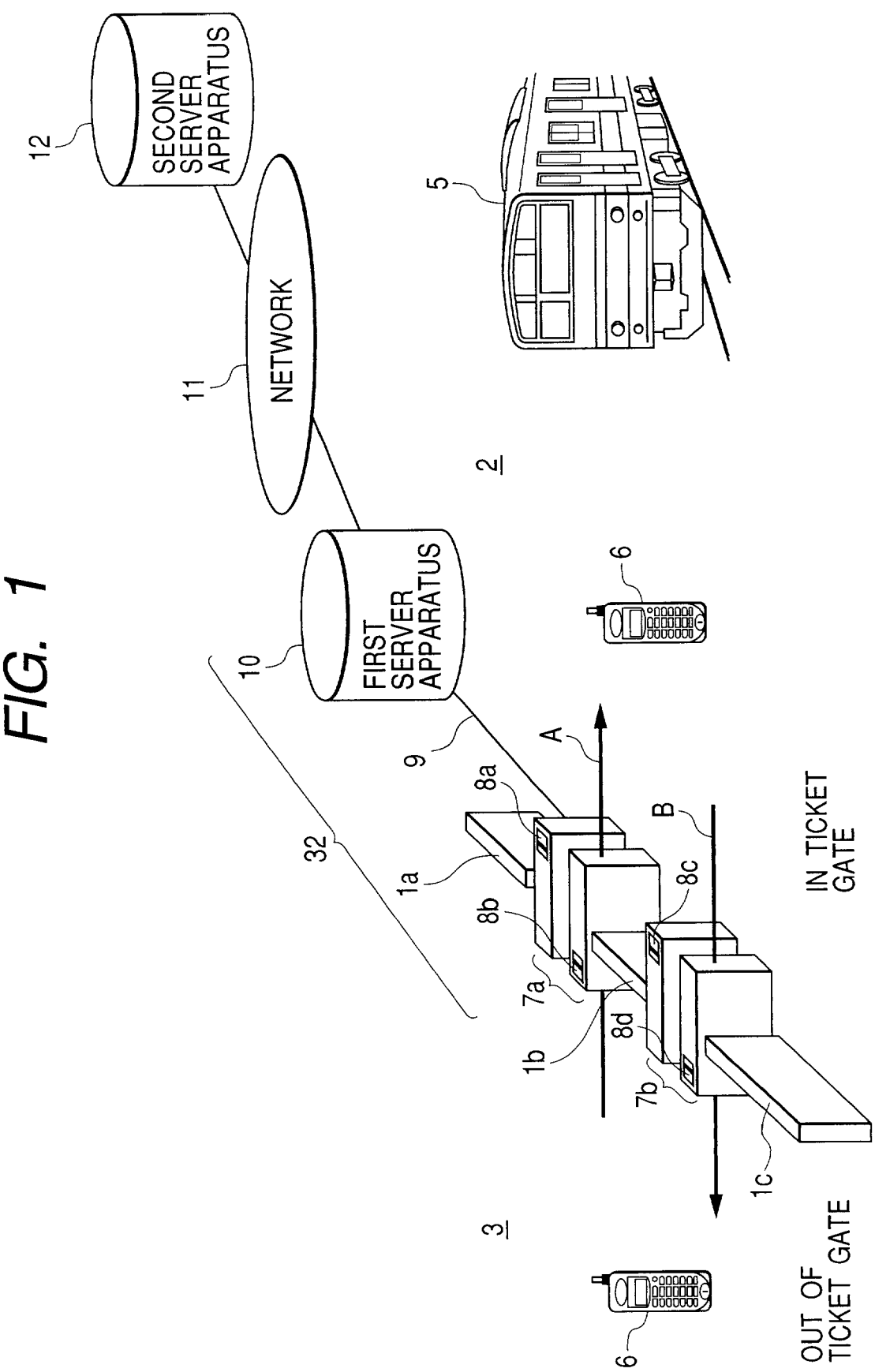
FIG. 1 is a diagram showing the structure of a wireless communication system according to a first embodiment of the invention.

FIG. 1 is a diagram showing the structure of a wireless communication system according to a first embodiment of the invention. This wireless communication system includes cellular phones 6 as wireless communication terminals, an automatic ticket gate system (entrance/exit management system) 32 managed by a railway company, and a second server apparatus 12 managed by a mobile communication carrier for subscriber information (user information) such as communication service mode and user profile information. In the automatic ticket gate system 32, an automatic ticket gate 7 for managing entrance/exit of persons is connected via a wired communication line 9 to a first server apparatus 10 which collectively controls the automatic ticket gate 7 by collecting information from the automatic ticket gate 7.

The automatic ticket gate system divides a spatial area into a communication restriction area (an area inside the ticket gate) 2 and a non-restriction area (an area outside the ticket gate) 3 by first to third partitions 1a to 1c. As indicated by arrows A and B, a number of unspecified persons enter the communication restriction area 2 or exist to the communication non-restriction area 3 via a first or second automatic ticket gate 7a or 7b. More specifically, the communication restriction area 2 is a spatial area into which a number of unspecified persons enter to use a train 5. The communication non-restriction area 3 is a spatial area in which persons got down from the train 5 or persons not using the train 5 walk. No communication restriction is set to this area so that users can communicate with desired partners according to their will.

The cellular phone 6 has a removable IC card as will be later described. When the person passes through the first or second automatic ticket gate 7a or 7b as indicated by the arrow A or B, a wireless channel is established between the cellular phone 6 and one of local wireless transceiving units (hereinafter called "ticket gate side local transceiving unit") 8a to 8d built in the first and second automatic ticket gates 7a and 7b. The first and second automatic ticket gates 7a and 7b have local wireless transceiving units (hereinafter called "ticket gate side local transceiving unit") 8a to 8d for communication with the cellular phone 6. Wireless communication is therefore possible between the cellular phone 6 and one of the ticket gate side local transceiving units 8a to 8d.

Figure 2:
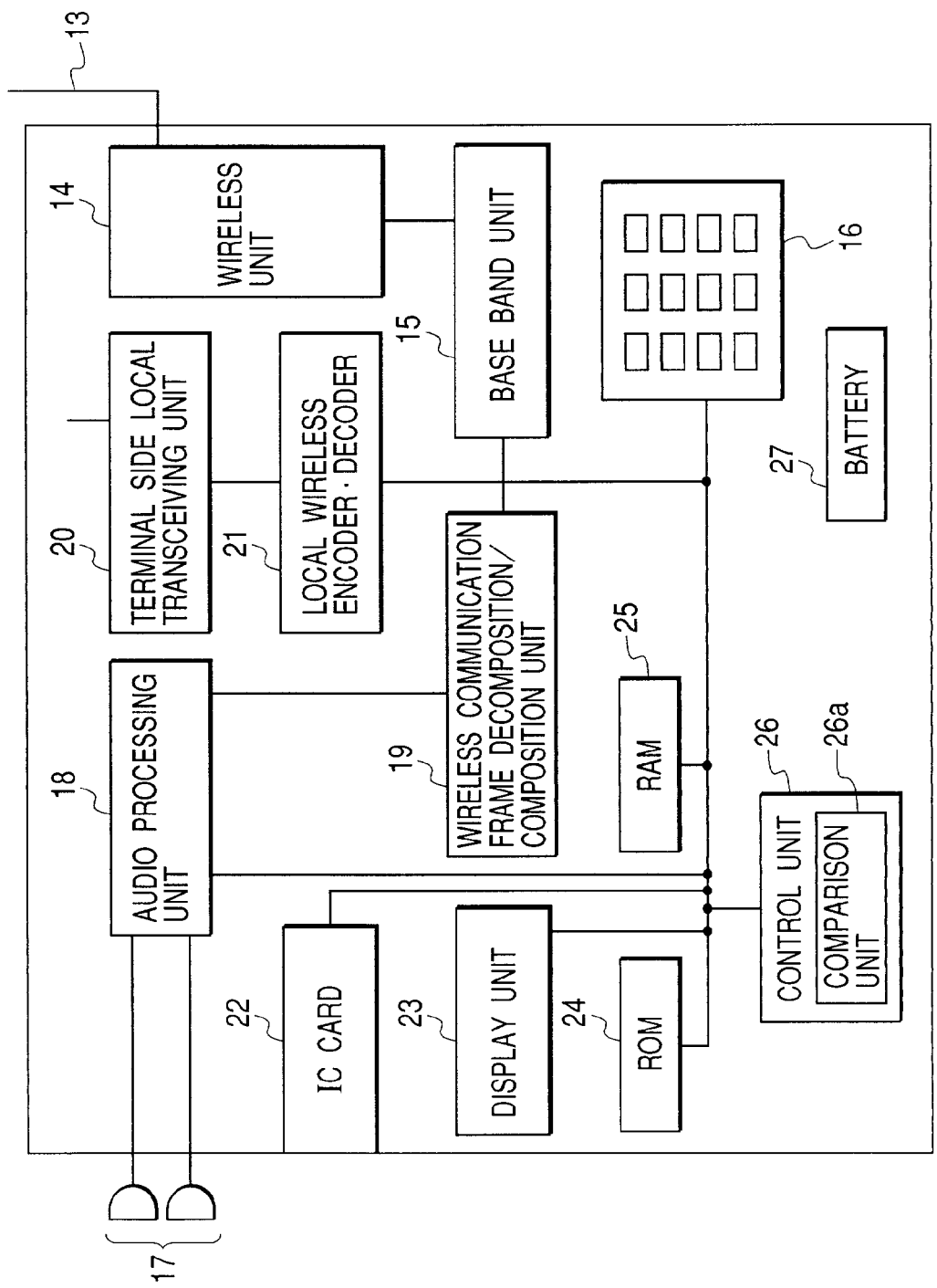
FIG. 2 is a block diagram showing the structure of a cellular phone according to an embodiment of the invention.

FIG. 2 is a block diagram showing the detailed internal structure of the cellular phone 6. The cellular phone 6 has a wireless unit 14, a baseband unit 15, an operation pad unit 16, an audio processing unit 18, a wireless communication frame decomposition/composition unit 19, a local wireless transceiving unit (hereinafter called a "terminal side local transceiving unit") 20, a local wireless encoder/decoder unit 21, a display unit 23, a ROM 24, a RAM 25 and a control unit 26. The wireless unit 14 performs wireless communication with a partner terminal connected to a public network via an antenna 13. The baseband unit 15 transfers a transmission/reception data signal without changing the frequency spectra of the data signal. The operation key pad unit 16 is used for entering desired information. The audio processing unit 18 encodes a voice signal input from a speaker/microphone unit 17, or decodes an encoded voice signal and outputs it to the speaker/microphone unit 17. The wireless communication frame decomposition/composition unit 19 is used for the decomposition/composition of a wireless communication frame. The terminal side local transceiving unit 20 establishes communication with one of the ticket gate side local transceiving units 8a to 8d. The local wireless encoder/decoder unit 21 encodes or decodes a transmission/reception signal of the terminal side local transceiving unit 20. The display unit 23 displays information input from the operation pad unit 16 and the like. ROM 24 stores predetermined arithmetic and logical programs and data. RAM 25 is used as a working area for temporarily storing arithmetic and logical operation results. The control unit 26 is connected to the above-described components and controls the entirety of the cellular phone 6. The cellular phone 6 has a removable IC card 22 which stores subscriber information to a mobile communication carrier and an electronic ticket application as a multi-application. The electronic ticket application as the multi-application is utilized as a certification for passing through an automatic ticket gate managed by a railway company.

The control unit 26 has a comparison unit 26a for performing a predetermined communication control by comparing a communication service mode desired by the user with a communication restriction mode requested by the manager. A battery 27 is housed in the cellular phone 6 for driving the latter.

FIG. 3 shows an operation level table storing operation levels of the cellular phone 6. This operation level table is stored in RAM 25 so that the data is rewritable.

Level "0" is a non-restriction mode in which a communication type is unlimited and communication is possible without any restriction. Level "1" is a manner mode in which a calling sound in real time communication is automatically turned off when a phone function is used or in other cases. Level "2" is a drive mode in which the real time communication is automatically responded. Level "3" is a real time communication restriction mode in which all real time communications are inhibited and only non-real time communication such as email is permitted. Level "4" is a call in-out restriction mode in which call in-out of all communications is inhibited irrespective of whether the communication is either real time or non-real time. Level "5" is a wireless signal transmission restriction mode in which transmission of radio signals themselves is inhibited.

In this embodiment, operation levels of six stages are provided so that communication control of the cellular phone 6 can be executed in a manner suitable for the area where the cellular phone 6 is located.

FIG. 4 shows a management table used for a mobile communication carrier to manage user information of the cellular phone 6. This management table is stored in the second server apparatus 12.

More specifically, in this embodiment, when a communication request is issued from a partner communication terminal, a non-restriction mode of free communication is set during the time zone from "00:00" hour to "07:00" hour, an automatic answering telephone mode is set during the time zone from "07:00" hour to "10:00" hour, a direct transfer mode of direct voice transfer is set during the time zone from "10:00" hour to "17:00" hour, and a data conversion transfer mode of transferring data by converting it into character strings or the like is set during the time zone from "17:00" hour to "24:00" hour.

FIG. 5 shows the format of function information parameters written in the IC card 22. The function information parameters include operation level information of wireless communication, communication restriction acceptance information representative of acceptance or rejection of communication restriction modes, a subscriber identifying code length, a unique subscriber identifying code, and a check sum.

FIG. 6 is a sequence diagram illustrating the operation of the wireless communication system to be executed when a user carrying a cellular phone 6 passes through the automatic ticket gate 7 from the communication non-restriction area 3 into the communication restriction area 2.

During the period while the user carrying the cellular phone 6 moves from the communication non-restriction area 3 into the communication restriction area 2, first a communication link is established between the ticket gate side local transceiving unit 8 and a terminal side local transceiving unit 20 by a communication protocol for non-contact IC cards (P1).

As the communication link is established, by using this link the ticket gate side local transceiving unit 8 exchanges messages regarding electronic ticket applications with the IC card 22 (P2). If the electronic ticket has a qualification of passing through the ticket gate, the unit 8 exchanges messages regarding the communication condition restriction with the IC card 22 by using a subscriber information management application (P3).

More specifically, for exchanging the message regarding the communication condition restriction, as shown in FIG. 7 the ticket gate side local transceiving unit 8 issues a communication function restriction request to the terminal side local transceiving unit 20.

Next, the terminal side local transceiving unit 20 transmits the received the communication function restriction request to the subscriber information management application (P12).

Upon reception of the communication function restriction request, the control unit 26 of the IC card 22 judges whether the communication restriction request is accepted or not. Namely, by referring to the communication service mode desired by the user, the comparison unit 26a compares the communication service mode with the communication restriction mode set by a manager (in this embodiment, railway company) of the communication restriction area 2. If the communication restriction mode has the condition more severe than the communication service mode, the indication that the communication restriction mode set by the manager is accepted, is written in the storage field of the communication restriction acceptance information. On the other hand, if the communication restriction mode is equal to or more gentle than the communication service mode, the indication that the communication restriction mode set by the manager is not accepted, is written in the storage field of the communication restriction acceptance information. The function information parameters together with the communication restriction acceptance information is sent to the terminal side local transceiving unit 20 as a return message (P13). Upon reception of the return message, the terminal side local transceiving unit 20 instructs the control unit 26 to set the operation state to the operation level (refer to FIG. 3) matching the function information parameters, and transmits the function information parameters to the ticket gate side local transceiver unit 8 to ask about the confirmation of the function information parameters (P14). The control unit 26 sets the operation state to the operation level matching the notified function information parameters. More specifically, if the communication function restriction is made in conformity with the request from the manager, the cellular phone 6 changes the operation mode to the designated communication restriction mode, and thereafter transmits the changed function information parameters to the ticket gate side local transceiver unit 8 to ask about the confirmation of the communication function restriction. If the communication service mode desired by the user is accepted, the function information parameters without changing the operation mode are transmitted to ask about the confirmation of the communication function restriction.

After completion of the exchange of messages regarding the communication condition restriction between the IC card 22 and ticket gate side local transceiving unit 8, the automatic ticket gate 7 is opened because the electronic ticket stored in the IC card has a qualification of passing through the ticket gate and the cellular phone 6 has the communication restriction equal to or more severe than the communication restriction set by the automatic ticket system. The user of the train 5 can enter the communication restriction area 2 from the communication non-restriction area 3.

Wireless communication is controlled in this manner so that all cellular phones 6 in the communication restriction area 2 are within the restriction range set by the railway company.

As the user of the cellular phone 6 enters the communication restriction area 2, the automatic ticket gate 7 acquires the current time from a timer unit of the automatic ticket gate 7 to recognize the current time as an entering time (including year, month and day), and transmits a request message for registering the indication that the cellular phone 6 is in the communication restriction area (service area) 2, to the first server apparatus 10 (P4).

Figure 8:
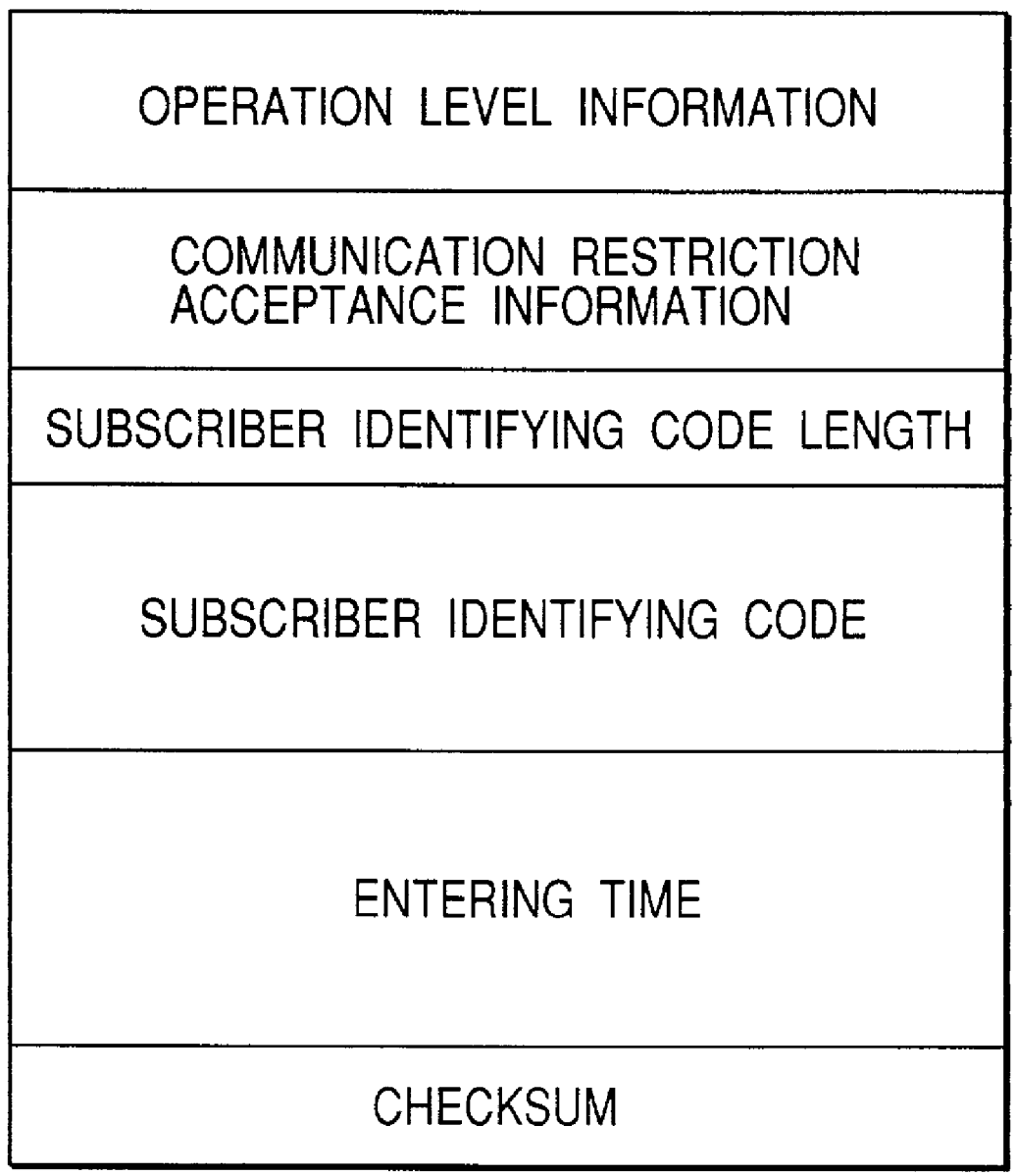
FIG. 8 is a diagram showing the format of a message for requesting registration of a cellular phone in a service area according to the embodiment.

FIG. 8 shows the format of the request message for registering the indication that the cellular phone is in the service area. The request message to be sent to the first server apparatus 10 includes operation level information of wireless communication, communication restriction acceptance information, a subscriber identifying code length, a subscriber identifying code, an entering time, and a check sum.

Next, upon reception of the request message, the first server apparatus 10 stores the information of the cellular phone 6 as in-service information and transfers the request message for registering the indication that the cellular phone is in the service area to the second server apparatus 12 via the network 11 (P5).

Upon reception of the request message, the second server apparatus 12 stores the indication that the cellular phone 6 is in the communication restriction area 2, and returns a message for confirming the registration of the indication that the cellular phone is in the service area back to the first server apparatus 10 (P6).

At this time, by referring the management table shown in FIG. 4, the second server apparatus 12 performs a communication control matching the entering time.

For example, if the current time is in the time zone from "07:00" hour to "10:00" hour, the operation mode is switched to the automatic answering mode, if it is in the time zone from "10:00" hour to "17:00" hour and there is a voice incoming call, the speech contents are directly transferred to the cellular phone 6, and if it is in the time zone from "17:00" hour to "24:00" hour, voice data is converted into character data through voice recognition and transmitted to the cellular phone 6.

Figure 9:
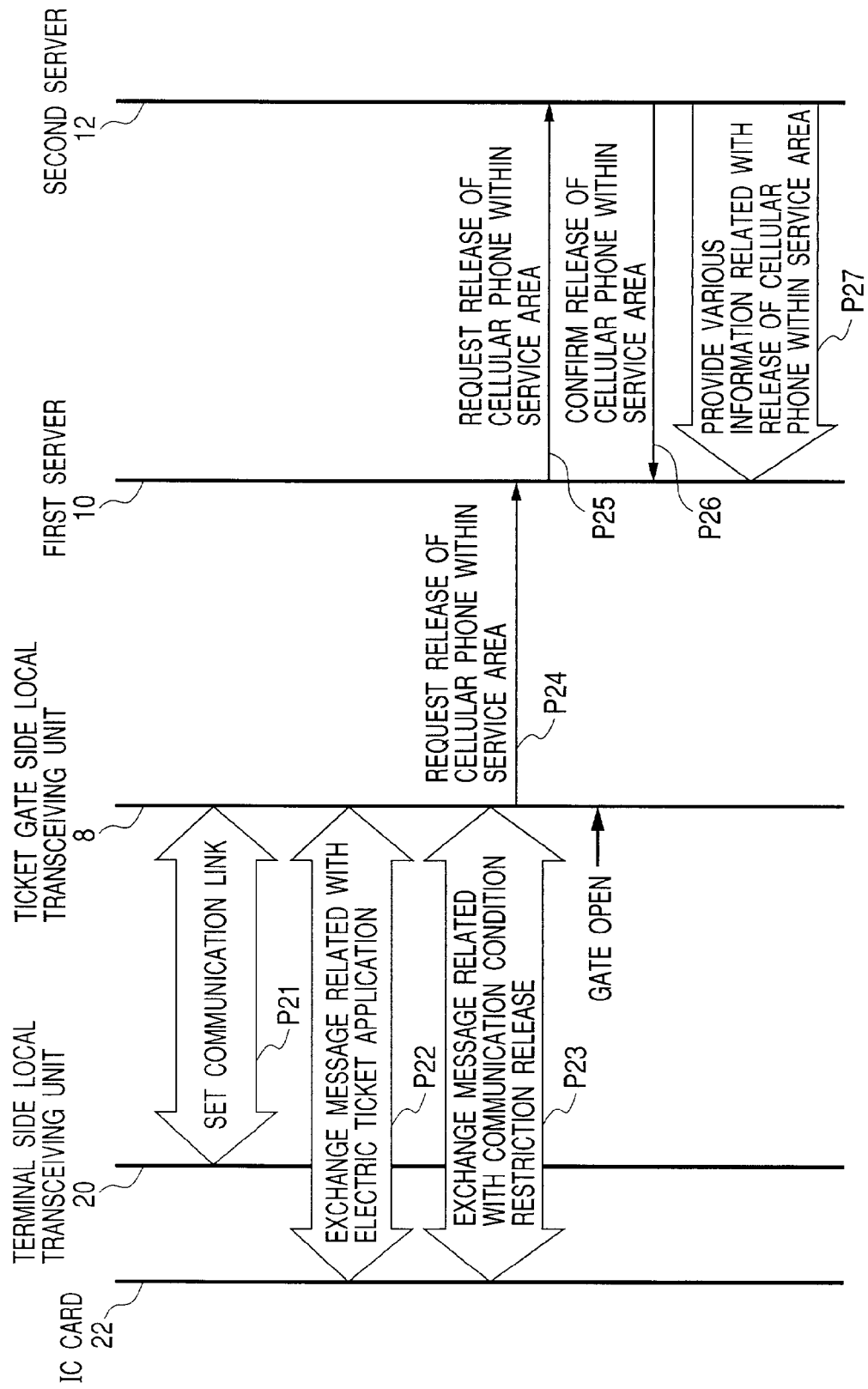
FIG. 9 is a diagram illustrating a communication condition restriction release process according to the embodiment.

FIG. 9 is a sequence diagram illustrating the operation of the wireless communication system to be executed when a user carrying a cellular phone 6 passes through the automatic ticket gate 7, leaves the communication restriction area 2 and enters the communication non-restriction area 3.

During the period while the user carrying the cellular phone 6 enters the communication non-restriction area 3 from the communication restriction area 2, similar to the entrance operation, first a communication link is established between the ticket gate side local transceiving unit 8 and a terminal side local transceiving unit 20 by a communication protocol for non-contact IC cards (P21).

As the communication link is established, by using this link the ticket gate side local transceiving unit 8 exchanges messages regarding electronic ticket applications with the IC card 22 (P22). Next, the unit 8 exchanges messages regarding the communication condition release with the IC card 22 by using a subscriber information management application (P23).

Figure 10:
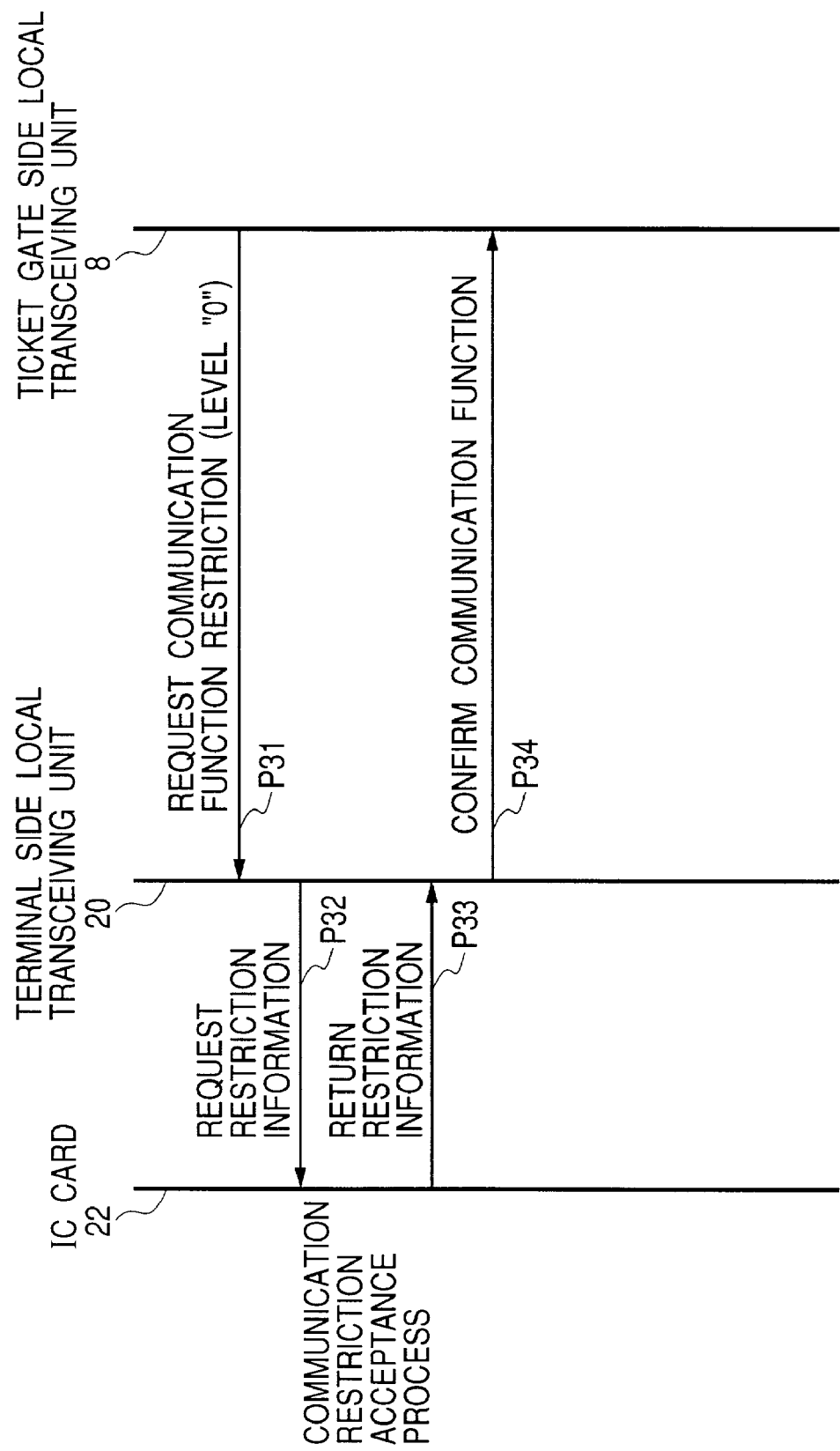
FIG. 10 is a sequence diagram illustrating a process of exchanging messages related to communication condition restriction release according to the embodiment.

More specifically, for exchanging the message regarding the communication condition release, as shown in FIG. 10 the ticket gate side local transceiving unit 8 issues a communication function restriction request to the terminal side local transceiving unit 20 by transmitting the function information parameters (P31). In this case, since the communication function restriction request signal aims at releasing the communication function restriction, the function information parameters are transmitted from the ticket gate side local transceiver unit 8 to the terminal side local transceiver unit 20 by setting the operation level to be added as a parameter to the level "0" (non-restriction mode).

Next, upon reception of the communication function restriction request, the terminal side local transceiver unit 20 transmits as a communication function restriction message the received function information parameters to the IC card (subscriber information management application) 22 (P32).

Upon reception of the communication restriction request message, the control unit 26 of the IC card 22 judges whether the communication restriction request is accepted or not. Namely, by referring to the communication service mode desired by the user, the comparison unit 26a compares the communication service mode with the communication restriction mode set by a manager of the communication restriction area 2. If the communication restriction mode has the condition more severe than the communication service mode, the indication that the communication restriction mode set by the manager is accepted, is written in the storage field of the communication restriction acceptance information. On the other hand, if the communication restriction mode is equal to or more gentle than the communication service mode, the indication that the communication restriction mode set by the manager is not accepted, is written in the storage field of the communication restriction acceptance information. In this case, since the communication restriction request from the ticket gate side local transceiver unit 8 is the level "0" (non-restriction mode) and the communication restriction mode is equal to or more gentle than the communication service mode, the indication that the communication restriction mode is not accepted, is generally written in the storage field of the communication restriction acceptance information. The function information parameters including such communication restriction acceptance information are returned to the terminal side local transceiver unit 20 as a return message (P33). Upon reception of the return message, the terminal side local transceiving unit 20 instructs the control unit 26 to set the operation level to the operation level (refer to FIG. 3) matching the received function information parameters and transmits the function information parameters to the ticket gate side local transceiver unit 8 to ask the ticket gate side local transceiver unit 8 about the confirmation of the function information parameters (P34). The control unit 26 sets the operation state to the operation level matching the notified function information parameters.

After completion of the exchange of messages regarding the communication condition restriction between the IC card 22 and ticket gate side local transceiving unit 8, the automatic ticket gate 7 is opened so that the user of the train 5 can exit from the communication restriction area 2 to the communication non-restriction area 3.

As the user exits from the communication restriction area 2 to the communication non-restriction area 3 in the above manner, the user carrying the cellular phone 6 can freely communicate without being managed by the railway company.

As the user carrying the cellular phone 6 enters the communication non-restriction area 3, the automatic ticket gate 7 acquires the current time from the timer unit built in the automatic ticket gate 7 to recognize the current time as a leaving time (including year, month and day), and transmits a request message for registering the indication that the cellular phone 6 is in the communication non-restriction area 3, to the first server apparatus 10 (P24).

Figure 11:
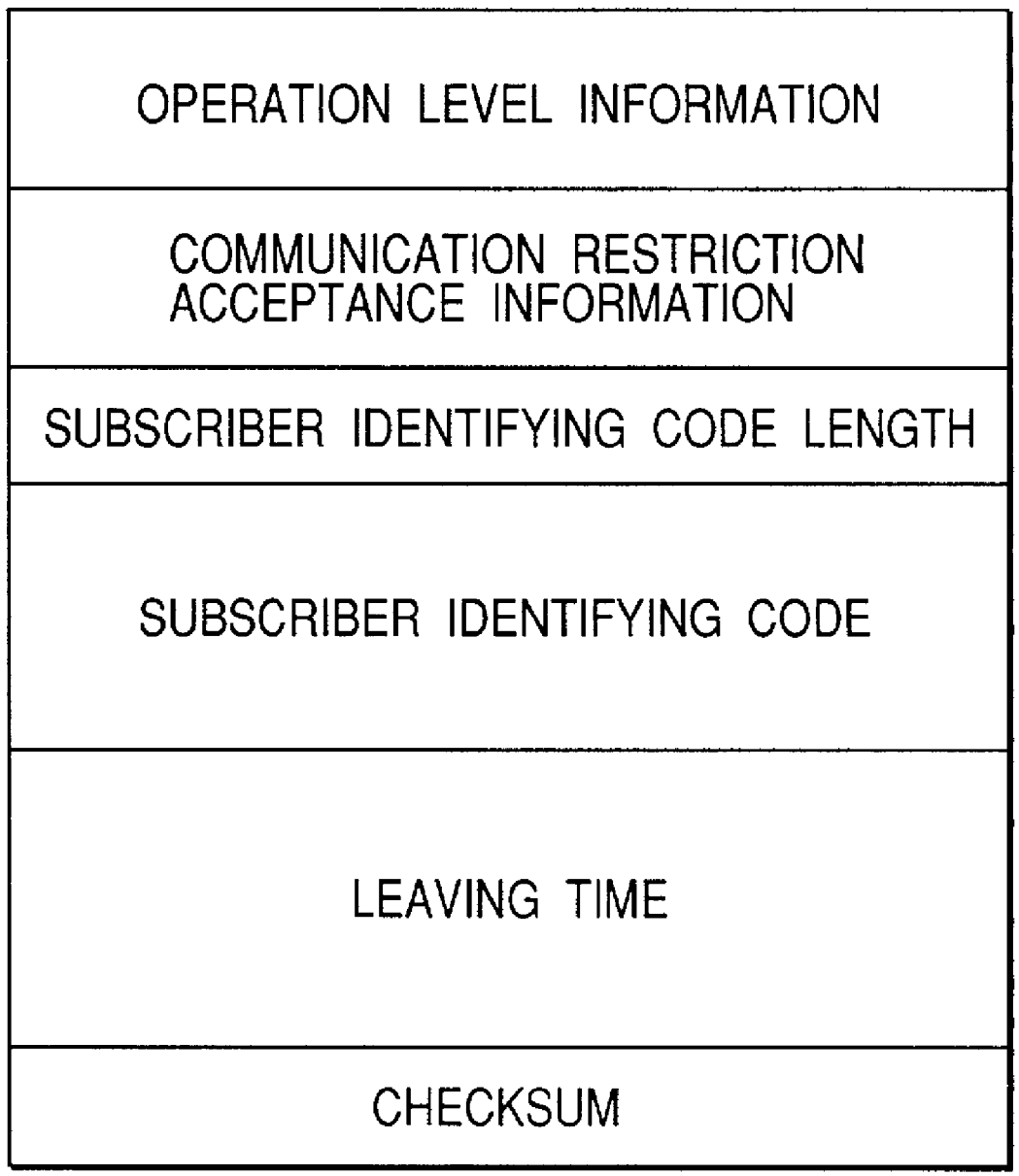
FIG. 11 is a diagram showing the format of a message for requesting release of a cellular phone in the service area according to the embodiment.

FIG. 11 shows the format of the request message for registering the indication that the cellular phone is in the service area. The request message to be sent to the first server apparatus 10 includes operation level information of wireless communication, communication restriction acceptance information, a subscriber identifying code length, a subscriber identifying code, a leaving time, and a check sum.

Next, upon reception of the request message, the first server apparatus 10 deletes the information of the cellular phone 6 from in-service information and transfers a request message for releasing the registration of the indication that the cellular phone is in the service area, to the second server apparatus 12 via the network 11 (P25).

Upon reception of the request message, the second server apparatus 12 deletes the in-service information from the information of the cellular phone 6, returns a message for confirming the deletion of the in-service information back to the first server apparatus 10 (P26), and supplies various information of the cellular phone 6 out of the service (P27).

It is therefore possible to perform communication control of the cellular phone 6 in accordance with the communication conditions (acceptance of incoming and outgoing calls, incoming call ringing method, automatic activation of answering phone function and the like) notified in response to the request message.

According to the embodiment, a mobile communication carrier which provides communication services can reliably recognize the existence of the cellular phone 6 in the communication restriction area and realize communication services suitable for a communication use area and time.

More specifically, according to the embodiment, the cellular phone in the communication restriction area 2 can be controlled to be in a communication restriction state matching the needs of a manager of the communication restriction area, whereas the cellular phone in the communication non-restriction area 3 can be automatically controlled to be in a communication function state desired by the user. The cellular phone 6 can be managed in real time by automatically storing the state and profile information of the cellular phone 6, and a communication service mode suitable for the position of the cellular phone 6 and time can be realized by exchanging information between the cellular phone 6 and service carrier via the network 11.

Figure 12:
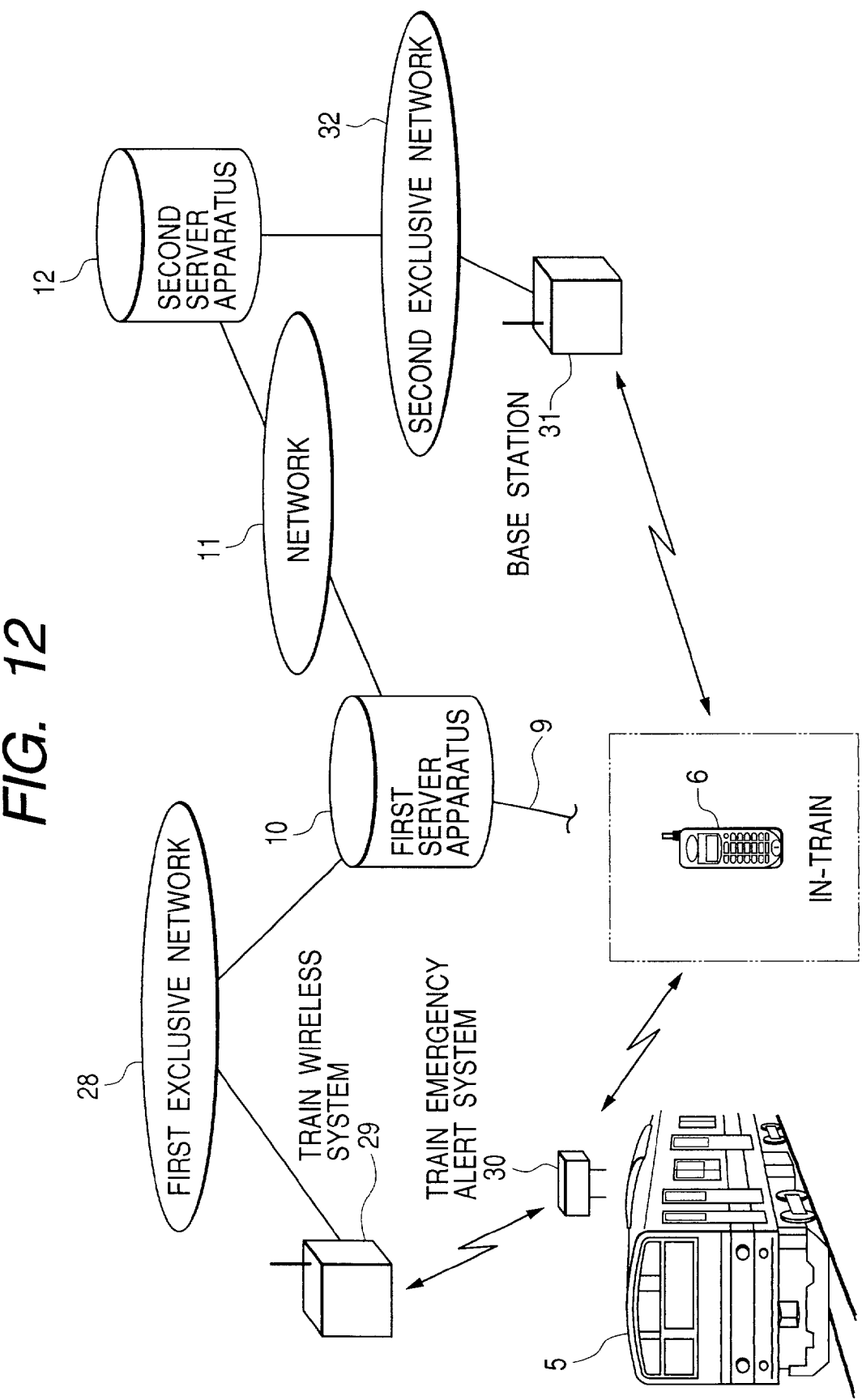
FIG. 12 is a diagram showing the structure of a wireless communication system according to a second embodiment of the invention.

FIG. 12 is a diagram showing the structure of a wireless communication system according to a second embodiment of the invention. In the second embodiment, in addition to the functions of the first embodiment, a function of forcibly releasing the communication restriction when an emergency state occurs.

In the second embodiment, in addition to the structure (FIG. 1) of the first embodiment, a first server apparatus 10 is connected to a train wireless system 29 via an exclusive network (first exclusive network) 28 of a railway company which is connectable to a train emergency alert system 30 through wireless connection. The train emergency alert system 30 has an emergency information notifying unit for notifying emergency information via the train wireless system 29 and a release signal transmitting unit for transmitting a release signal for releasing the communication restriction state of cellular phones 6. When any emergency state of the train 5 occurs such as an emergency stop, an accident, and a criminal act such as train hijack, the communication restriction of the cellular phone 6 in the train 5 can be released.

In FIG. 12, reference numeral 31 represents a base station of the mobile communication carrier. The base station 31 is connected to a second server apparatus 12 via an exclusive network (second exclusive network) 32 of the mobile communication carrier.

FIG. 13 is a sequence diagram illustrating the operation of the wireless communication system to be executed when an emergency state occurs.

When the train emergency alert system 30 detects an emergency state (e.g., emergency stop, accident, criminal act such as hijack, respectively of the train 5), the system 30 notifies the first server apparatus 10 of an occurrence of an emergency state of the train 5 via the train wireless system 29 and first exclusive network 28 (P41), and notifies the cellular phone 6 in the train 5 of the release of the communication restriction because of the occurrence of an emergency state, by using a broadcast control signal (P42).

In the second embodiment, the train emergency alert system 30 repetitively transmits the broadcast control signal to the cellular phone 6 in the train 5 in order to prevent a communication restriction release error to be caused by a burst reception error of the cellular phone 6.

When the cellular phone 6 recognizes the communication restriction release by the occurrence of the emergency state, the phone 6 performs a location registration process for the base station 31 (P43). In this location registration process, emergency state occurrence information is added as a reason indication parameter.

Next, the base station 31 searches the reason indication parameter given by the location registration process. When the emergency state occurrence information is recognized, the base station 31 supplies the second server apparatus 12 with subscriber information of the cellular phone 6 and instructs the second server apparatus 12 to execute a location registration process because of the occurrence of the emergency state (P44).

The second server 12 searches the railway company of the train from the subscriber information of the cellular phone 6 stored in the second server apparatus 12 and supplies the first server apparatus 10 with the user profile information of the cellular phone 6 as the passenger information of the train 5 in the emergency case (P45).

The first server apparatus 10 stores the received user profile information of the cellular phone 6 together with the time (including year, month, and day) in the passenger list of the train 5 in the emergency state, and recognizes the communication restriction release of the cellular phone 6 carried by the user.

FIG. 14 is a sequence diagram illustrating the operation of the wireless communication system to be executed when the emergency state is released.

First, when the train emergency alert system 30 detects the release of the emergency state, the system 30 notifies the first server apparatus 10 of the release of the emergency state of the train 5 via the train wireless system 29 and first exclusive network 28 (P51), and notifies the cellular phone 6 in the train 5 of the restart of the communication restriction because of the release of the emergency state, i.e., communication restriction restart information, by using the broadcast control signal (P52).

In the second embodiment, the train emergency alert system 30 repetitively transmits the broadcast control signal to the cellular phone 6 in the train 5 in order to prevent a communication restriction release error to be caused by a burst reception error of the cellular phone 6.

When the cellular phone 6 recognizes the communication restriction restart by the release of the emergency state, the cellular phone 6 performs again a location registration process for the base station 31 (P53).

In this location registration process, emergency state release information is added as a reason indication parameter.

Next, the base station 31 searches the reason indication parameter given by the location registration process. When the emergency state release information is recognized, the base station 31 supplies the second server apparatus 12 with user information of the cellular phone 6 and instructs the second server apparatus 12 to execute a location registration process because of the release of the emergency state (P54).

The second server 12 searches the railway company of the train from the subscriber information of the cellular phone 6 stored in the second server apparatus 12 and supplies the first server apparatus 10 with the user profile information of the cellular phone 6 as the passenger information of the train 5 released from the emergency case (P55).

The first server apparatus 10 stores the received user profile information of the cellular phone 6 together with the time (including year, month, and day) in the passenger list of the train 5 released from the emergency state, and recognizes the communication restriction restart of the cellular phone 6 carried by the user.

According to the second embodiment, when an emergency state occurs, the communication condition restriction of the cellular phone 6 in the communication restriction area can be released smoothly, and when the emergency state is released, the communication condition restriction can be restarted smoothly. Since the user profile information of the cellular phone 6 in the area where the emergency state occurs is managed by the first server apparatus 10 managed by the railway company, information of a user in the emergency state can be quickly grasped.

The present invention is not limited only to the above-described embodiments. Although a cellular phone is used as a wireless communication terminal, other wireless communication terminals may also be used such as a mail terminal, a Web terminal, a wireless LAN terminal. The entrance/exit management system for controlling entering/leaving may have an entering/leaving gate with an automatic lock function capable of limiting the entrance direction (such as an automatic door with a limited entrance direction and a rotary pole gate).

A communication medium for information transfer between the cellular phone and the entrance/exit management system may use a wireless local interface of a low power (such as Bluetooth and IrDA) in place of the non-contact IC card wireless communication interface.

In the above-described embodiments, an automatic ticket gate system managed by a railway company is used as the wireless communication system. The wireless communication system of the invention is also applicable to the systems managed by a building manager or land manager of a theme park, a stadium or the like.

As described in detail, according to the invention, communication restriction desired by a manager or owner of a building or the like can be made when a user of a wireless communication terminal enters the communication restriction area. Therefore, the manager or owner of a building or the like is not required to announce inhibition of the use of the wireless communication terminal to the user, and other persons in the building are not disturbed. Outside the communication restriction area, a user of a wireless communication terminal can communicate in a communication state desired by the user.

The entrance/exit management system is connected to the first server apparatus which is connected to the second server system. Since the first and second server apparatuses control a wireless communication terminal, the terminal in the communication control area can be managed in real time.

When an emergency state occurs, the communication restriction mode is released so that the emergency state which may hurt human bodies can be dealt with quickly.

What is claimed is:

1. A system having an entrance/exit management apparatus for regulating an entrance/exit of a person and a wireless communication terminal for communicating with the entrance/exit management apparatus, wherein:

the entrance/exit management apparatus comprises:

a transceiving device adapted to transmit, by a first wireless communication method, a communication function restriction request to the wireless communication terminal and to receive a response to the communication function restriction request from the wireless communication terminal; and a gate device adapted to permit an entrance/exit of a person when the transmitting of the communication function restriction request and the receiving of the response by said transceiving device is completed; and the wireless communication terminal comprises:

a first communication device adapted to communicate with the entrance/exit management apparatus by the first wireless communication method;

a second communication device adapted to communicate by a second wireless communication method; and a restriction device adapted to restrict communication of said second communication device in accordance with the communication function restriction request received from said transceiving device by said first wireless communication method.

2. A system having an entrance/exit management apparatus for regulating an entrance/exit of a person and having a server apparatus for managing an entrance/exit of a person, wherein:

the entrance/exit management apparatus comprises:

a transceiving device adapted to transmit, by a first wireless communication method, a communication function restriction request to a wireless communication terminal and to receive a response to the communication function restriction request from the wireless communication terminal;

a gate device adapted to permit an entrance/exit of a person when the transmitting of the communication function restriction request and the receiving of the response by said transceiving device is complete; and a notification device adapted to notify the server apparatus of an indication that the wireless communication terminal from which the response was received by said transceiving device exists in a predetermined area; and the server apparatus comprises:

a management device adapted to manage an existence location of the wireless communication terminal in accordance with a notice supplied from said notification device.

3. A system according to claim 2, wherein said management device notifies the existence location of the wireless communication terminal to a second server apparatus owned by a carrier providing wireless communication for the wireless communication terminal.

4. A system according to claim 2, wherein said management device also manages an entering/leaving time of the wireless communication terminal relative to the predetermined area.

5. An entrance/exit management apparatus for regulating an entrance/exit of a person, comprising:

a transceiving device adapted to transmit, by a first wireless communication method, a communication function restriction request to a wireless communication terminal and to receive a response to the communication function restriction request from the wireless communication terminal; and a gate device adapted to permit an entrance/exit of a person when the transmitting of the communication function restriction request and the receiving of the response by said transceiving device is complete.

6. An entrance/exit management apparatus according to claim 5, wherein said gate device regulates an entrance/exit of a person by opening/closing of a gate.

7. An entrance/exit management apparatus according to claim 5, wherein the communication function restriction request is used for selecting one of a non-restriction mode without communication restriction, a manner mode of automatically turning off incoming call sounds of real time communication, a drive mode of automatically responding to real time communication, a real time communication inhibition mode of permitting only non-real time communication, a call in/out restriction mode of inhibiting call in/out of all communications, and a wireless signal transmission restriction mode of inhibiting transmission of a wireless communication signal.

8. An entrance/exit management apparatus according to claim 5, wherein the response contains information indicating a communication function by the second wireless communication method after the communication function restriction request is received.

9. An entrance/exit management apparatus according to claim 5, further comprising a notification device adapted to notify a server apparatus of an entering/leaving state of the wireless communication terminal relative to a predetermined area.

10. An entrance/exit management apparatus according to claim 5, further comprising a notification device adapted to notify a server apparatus of an entering/leaving time of the wireless communication terminal relative to a predetermined area.

11. An entrance/exit management apparatus according to claim 5, wherein said transceiving device transmits an indication signal for releasing the restriction of communication by the second wireless communication method when the wireless communication terminal exits from a predetermined area.

12. A wireless communication terminal comprising:
a first communication device adapted to communicate with an entrance/exit management apparatus for regulating an entrance/exit of a person by a first wireless communication method;
a second communication device adapted to communicate by a second wireless communication method; and
a restriction device adapted to restrict communication of said second communication device in accordance with a communication function restriction request received by said first communication device from the entrance/exit management apparatus which regulates the entrance/exit of the person.

13. A wireless communication terminal according to claim 12, further comprising a transmission device adapted to transmit information on the communication restriction as a response to the communication function restriction request, and wherein the entrance/exit management apparatus regulates an entrance/exit of a person in accordance with contents of the response.

14. A wireless communication terminal according to claim 12, wherein said second communication device can switch among a plurality of communication restriction modes, and said restriction device changes the communication restriction mode of said second communication device in accordance with a mode designated by the entrance/exit management apparatus.

15. A wireless communication terminal according to claim 14, wherein when a person enters a predetermined area, if communication restriction of the mode designated by the entrance/exit management apparatus is more severe than communication restriction of a mode preset to said second communication mode, said restriction device changes a mode of said second communication device to the designated mode, whereas if not more severe, the mode is not changed.

16. A wireless communication terminal according to claim 14, wherein the communication restriction modes include at least one of a non-restriction mode without communication restriction, a manner mode of automatically turning off incoming call sounds of real time communication, a drive mode of automatically responding to real time communication, a real time communication inhibition mode of permitting only non-real time communication, a call in/out restriction mode of inhibiting call in/out of all communications and a wireless signal transmission restriction mode of inhibiting transmission of a wireless communication signal.

17. A control method for a system having an entrance/exit management apparatus for regulating an entrance/exit of a person and a wireless communication terminal for communicating with the entrance/exit management apparatus, wherein:
the entrance/exit management apparatus executes:
a transceiving step of transmitting, by a first wireless communication method, a communication function restriction request to the wireless communication terminal and of receiving a response to the communication function restriction request; and
a permitting step of permitting an entrance/exit of a person when the transmitting of the communication function restriction request and the receiving of the response in said transceiving step is completed; and
the wireless communication terminal has a second communication device adapted to communicate by a second wireless communication method, and the wireless communication terminal executes:
a communication step of communicating, via a first communication device, with the entrance/exit management apparatus by the first wireless communication method; and
a restricting step of restricting communication of the second communication device in accordance with the communication function restriction request received in said transceiving step by the first wireless communication method.

18. A control method for a system having an entrance/exit management apparatus for regulating an entrance/exit of a person and having a server apparatus for managing an entrance/exit of a person, wherein:
the entrance/exit management apparatus executes:
a transceiving step of transmitting, by a first wireless communication method, a communication function restriction request to a wireless communication terminal and of receiving a response to the communication function restriction request;
a permitting step of permitting an entrance/exit of a person when the transmitting of the communication function restriction request and the receiving of the response in said transceiving step is complete; and
a notification step of notifying the server apparatus of an indication that the wireless communication terminal from which the response was received in said transceiving step exists in a predetermined area; and
the server apparatus executes:
a management step of managing an existence location of the wireless communication terminal in accordance with a notice supplied by said notification step.

19. A control method for an entrance/exit management apparatus for regulating an entrance/exit of a person, comprising:
a transceiving step of transmitting a communication function restriction request to a wireless communication terminal by a first wireless communication method, and of receiving a response to the communication function restriction request, from the wireless communication terminal; and
a permitting step of permitting an entrance/exit of a person when the transmitting of the communication function restriction request and the receiving of the response in said transceiving step is complete.

* * * * *